Jan. 16, 1940.　　　　R. C. BAKER　　　　2,187,483
WELL CEMENTING APPARATUS
Filed April 21, 1939　　　2 Sheets-Sheet 1
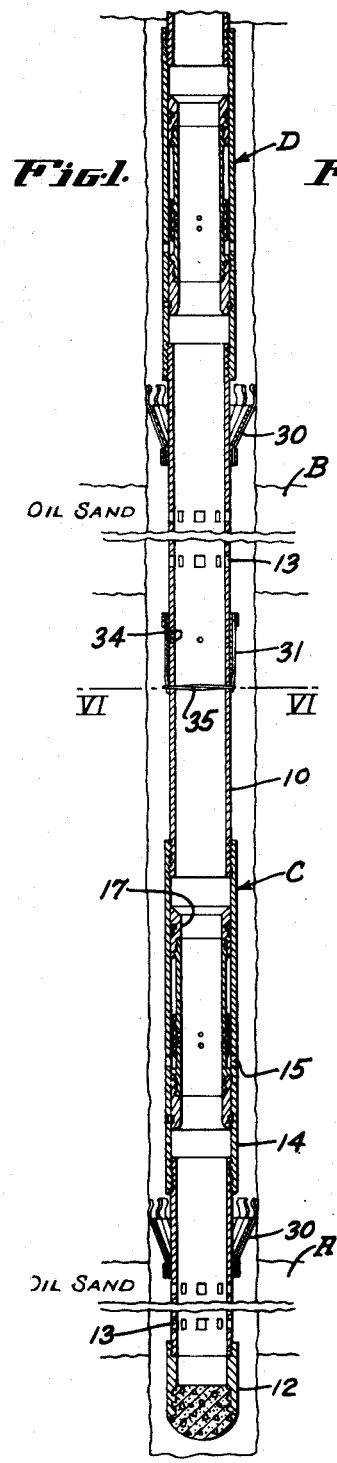
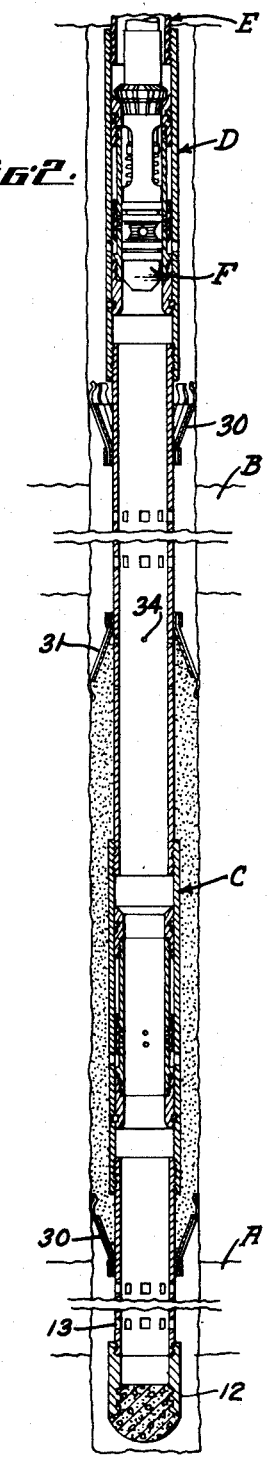
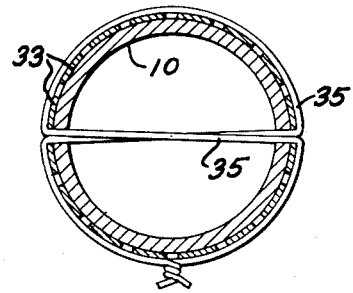
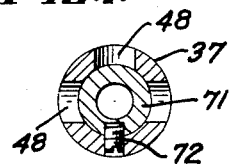
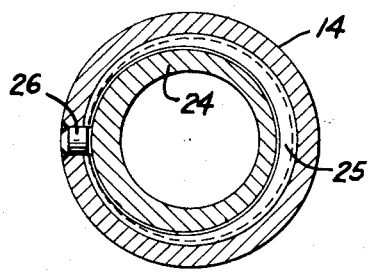
INVENTOR.
REUBEN C. BAKER
BY Oscar A. Mellin
ATTORNEY.

Jan. 16, 1940.  R. C. BAKER  2,187,483
WELL CEMENTING APPARATUS
Filed April 21, 1939  2 Sheets-Sheet 2
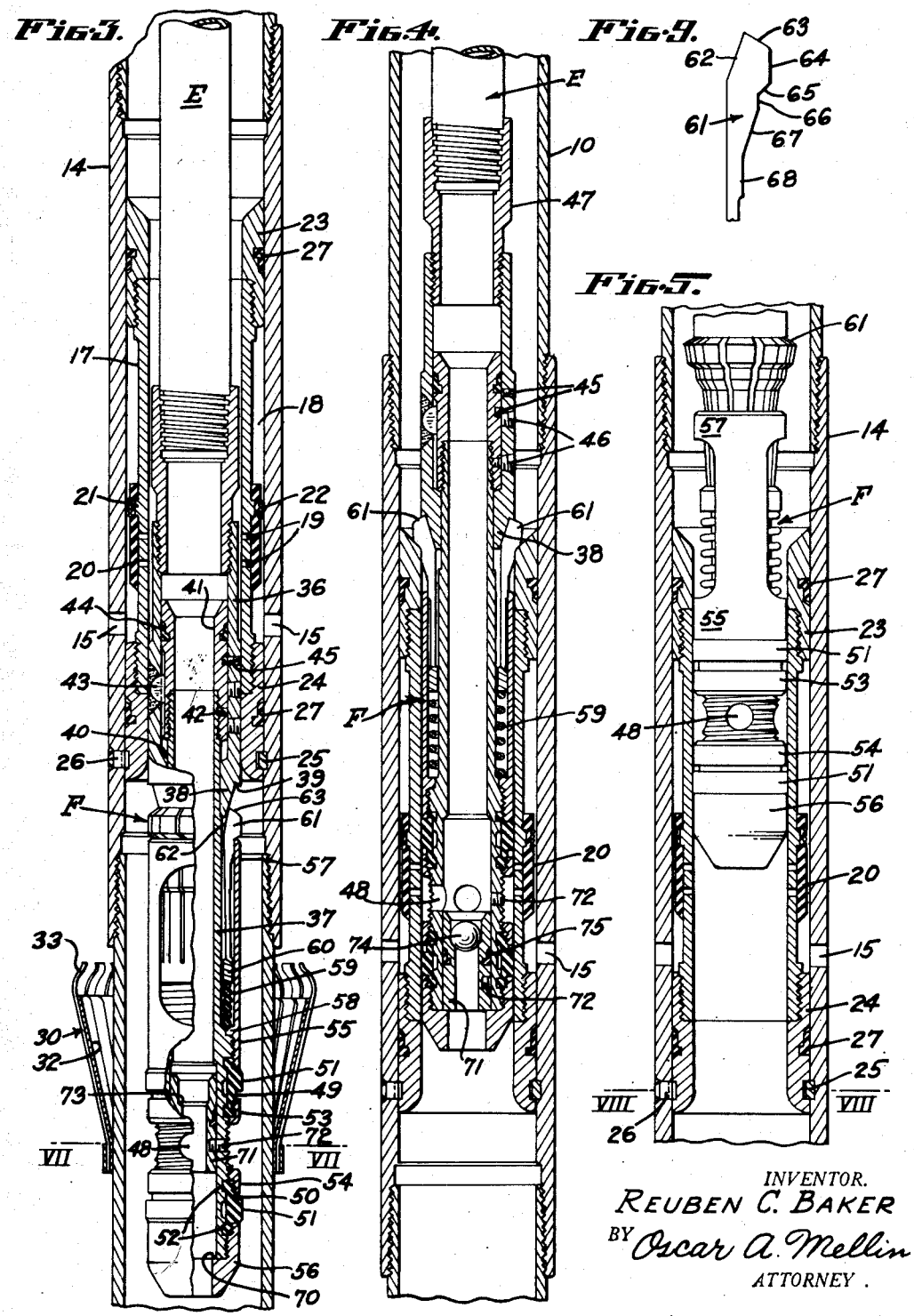
INVENTOR.
REUBEN C. BAKER
BY Oscar A. Mellin
ATTORNEY.

Patented Jan. 16, 1940

2,187,483

UNITED STATES PATENT OFFICE 2,187,483

WELL CEMENTING APPARATUS

Reuben C. Baker, Coalinga, Calif., assignor to Baker Oil Tools, Inc., Huntington Park, Calif., a corporation of California Application April 21, 1939, Serial No. 269,135

26 Claims. (Cl. 166—1)

This application is a continuation in part of my pending application entitled "Well cementing apparatus", filed December 12, 1938, and bearing Serial No. 245,238.

The invention relates to well cementing apparatus having particular utility in the placing of cement in the annular space between the wall of a well bore and a casing or liner disposed in said bore.

In the drilling of deep wells, and particularly in the drilling of oil wells, it is common practice to cement in a well bore a water string of casing or a liner in order to obtain a water shut-off. There are many instances, especially where more than one oil bearing strata is encountered, when it is desirable to secure such a water shut-off at several separate locations along such casing or liner by ejecting separate charges of cement laterally through discharge ports formed in the casing or liner wall at vertically spaced points or stations, in the accomplishment of what may aptly be termed series or multiple stage cementing. Such series cementing may be employed to entirely cement in a casing string, or to cement above and below a productive formation to protect such formation until such a time as it is desired to produce therefrom. Such series cementing may be employed to cement a liner which is perforated at intervals relatively spaced to correspond with the depths and extent of two or more known productive strata, so as to prevent an encroachment of water into said productive strata. In fact, it may be employed in any situation where series or stage cementing is required or is desirable.

It is the principal object of the present invention to provide an improved apparatus capable of use in cementing a well bore at vertically spaced intervals for the protection of productive formations against the encroachment of migratory water, or for the purpose of blocking off one or more such formations to protect and conserve the oil content thereof for subsequent production.

In practicing my invention, I preferably incorporate in the casing or liner a plurality of cement discharge devices disposed vertically at selected intervals along the length thereof and constituting successive discharge points or stations at which the cement slurry is to be ejected, and further, said casing or liner is provided with external cement retaining means initially capable of passing downwardly into the well bore and subsequently functioning to define the upper and lower limits of each cementing zone. With the casing or liner properly positioned in a well bore, it is my purpose to first circulate the well drilling fluid to flush from the well bore drilling detritus or other substances which may tend to interfere with the subsequent cementing operations, and to then perform the several cementing operations in upward progressive sequence, all by means of a single tubing string under the manipulative control of an operator at the well surface.

One form which the invention may assume is exemplified in the following description and illustrated by way of example in the accompanying drawings, in which:

Fig. 1 is a vertical section through a portion of a well bore and the liner or casing therein and illustrating the condition of the liner or casing when it is first positioned in the well.

Fig. 2 is a similar vertical section illustrating the results accomplished by a first cementing operation and showing a preferred type of cementing string which has been manipulated from the well surface to bring its terminal cementing mandrel into cooperative engagement with an upper cement discharge device which forms a part of the liner.

Fig. 3 is an enlarged vertical section of the liner at a cementing station thereof and illustrating the cementing string as it is first lowered through the several cement discharge devices to bring its mandrel below the lowermost thereof and showing the latch means of said mandrel retained in initial inactive condition.

Fig. 4 is an enlarged vertical section showing the cement string mandrel in cooperative engagement with one of the cement discharge devices of the liner and in condition for a cementing operation.

Fig. 5 is a similar section showing the mandrel disposed within a said discharge device in position for a testing of the mandrel packings, said mandrel being shown in elevation.

Fig. 6 is a somewhat enlarged transverse section taken on the line VI—VI of Fig. 1.

Fig. 7 is a transverse section through the mandrel taken on the line VII—VII of Fig. 3.

Fig. 8 is a transverse section taken on the line VIII—VIII of Fig. 5.

Fig. 9 is an enlarged detail side elevation of the upper end of one of the latch pawls.

In the accompanying drawings I have shown one form of an apparatus embodying the features of the present invention, and have illustrated its use in the series or stage cementing of a perforated liner passing through more than one productive strata.

In Fig. 1 the liner 10 is shown as lowered to its proper position in the well bore, the lower end thereof being preferably provided with a bull-plug casing shoe 12 to facilitate the running in of the liner. In this view is designated two productive strata A and B, the respective depths and extent of which have been previously ascertained during the drilling of the well bore. In the regions of such productive strata the liner is perforated to form a production screen 13 at each strata. Generally, it is desirable to cement above and below each productive strata and to this end the liner has incorporated therein relatively spaced cementing means disposed at locations dependent upon the relative positions and extent of the several productive strata. However, it is desired to point out that the number and relative position of the several cement discharge stations may be varied, depending upon the water conditions, the number of productive strata encountered, and the judgment of the operator.

The several cementing devices of the casing or liner are of duplicate construction, each comprising a cylindrical coupling member or casing collar 14 which is connected between adjacent pipe lengths and therefore forms a rigid part of the complete liner or casing. This collar 14 is provided with lateral cement discharge ports 15 disposed to discharge the cement into the annular space between the liner and the wall of the well bore. Mounted against movement within the bore of said coupling member is a stop sleeve 17 formed to provide an intermediate annular valve chamber 18 between said sleeve and the wall of the coupling member 14. The annular wall of this stop sleeve is provided with one or more transverse rows (two rows being shown in the drawings) of holes constituting passages 19 affording communication between the inner bore of the stop sleeve 17 and the annular valve chamber 18.

For the purpose of controlling the flow of cement through the passages 19, I provide a back-pressure valve 20 which functions to prevent reverse flow of the cement. Although other specific forms of back-pressure valves may be employed for this purpose, I preferably use a sleeve type of valve comprising a flexible sleeve formed of rubber or other suitable resilient material and disposed within the valve chamber 18 in position to surround the stop sleeve 17. The upper portion of the valve 20 has an internal groove which embraces an external bead 21 on the stop sleeve 17 and is securely fastened to said sleeve by being wired thereto as at 22. The upper portion of the valve sleeve is thus securely anchored above the passages 19 with the free skirt portion thereof normally lying in close contact with the stop sleeve and extending downwardly to close the several passages 19.

To facilitate assembling of the valve sleeve in its proper position, the stop sleeve is preferably formed of three screw-threaded sections tightly screwed together to form a rigid unit and including the intermediate portion having the passages 19 and carrying said valve 20, and upper and lower enlarged ring members 23 and 24 which closely fit in the bore of the coupling member 14.

This stop sleeve unit may be mounted within the associated coupling member in any desired manner, one means suitable for the purpose comprising a split eccentric ring 25 disposed within an eccentric external groove formed in the wall of the lower ring member 24 and within a companion concentric internal groove formed in the wall of said coupling member 14, as shown in Fig. 8, and a lateral stop stud 26 which is welded or otherwise secured in an accommodating bore in the wall of said coupling member and projects between the opposed ends of said split ring to prevent rotation of said ring and the stop sleeve.

Each stop unit is thus mounted against movement within the casing or liner and the opposite ends of its bore are chamfered or beveled outwardly for a purpose to be later described.

Since it is quite essential that there be no leakage of cement from the valve chamber 18 along the wall of the coupling member 14, the upper and lower ring members 23 and 24 of the stop sleeve 17 are each provided with suitable packing rings 27.

The several stop sleeve units 17 are made of aluminum or other readily drillable material so that they may be drilled out after the cementing job is completed and the cement sets, and after a water test and such other tests as are necessary or desirable have been conducted.

Surrounding and carried by the liner or casing 10 and disposed in the annular space between said liner and the wall of the well bore, I provide cement retaining means 30 and 31 respectively positioned below and above each point of cement discharge. Such means serve to define the extent of each cementing zone by arresting the downward and the upward flow of the cement in said annular space, and although other types of cement retaining means may be employed for this purpose, it is considered preferable to use the more or less well known expansible basket type of retaining means, the cement retaining baskets shown in the drawings being of a form generally referred to as "petal" baskets. Each of these baskets 30 and 31 have their closed or small ends securely attached to the liner 10. Their side walls are formed of a plurality of vertically extended, laterally overlapping thin petal-like members 32, see Fig. 3. The "petals" circularly overlap each other to a degree sufficient to permit expansion and contraction of the basket and to at all times maintain, in effect, a substantially continuous side wall. The "petals" of each basket are reinforced by a like number of relatively thin vertically disposed leaf springs 33 each secured to one of said "petals" with its free end extended beyond the free end of its companion "petal" and bowed inwardly toward the liner 10. These springs 33 have sufficient outward tension to normally expand the basket into engagement with the wall of the well bore.

It will be noted that each lower cement retaining basket 30 is disposed with its open end facing upwardly so that it will arrest the downward flow of the cement in the annular space while the companion upper basket 31 is reversely disposed in order to limit the upward flow of cement in said annular space. Also, it will be observed that at a point within the upper basket and closely adjacent its fixed end, the liner is bored to provide overflow passages 34 through which excess cement may flow from said annular space and into the liner.

For the purpose of insuring safe passage of the liner down the well bore, the several inverted cement retaining baskets or packers 31 are secured in collapsed condition, preferably by suitable means which project into the bore of the liner in position to be subsequently acted upon by an instrumentality later to be lowered into the liner and functioning to release said inverted baskets prior to the cementing operation. As shown in Figs. 1 and 6, a wire 35 of relatively soft metal is threaded through diametrically opposite apertures in the liner wall, and, passing between adjacent leaf springs 33 and below the basket "petals" 32, is wound around the several springs to hold the basket in collapsed condition, the opposite ends of said wire being twisted together.

A liner or water-string constructed and conditioned as above described is lowered into the well bore where it will be retained in proper position by any of the well known means usually employed for this purpose.

In carrying forward the cementing operation, I utilize a cementing string of tubing adapted to be lowered into the well to first sever the wires 35 associated with the reversed basket packers 31 and to thereafter be manipulated by an operator at the well surface, for cooperation with the several cementing devices in upward progressive sequence. The cementing string preferably comprises a tubing line E extending to the well surface and provided at its lower end with a cement discharge device F, which, although functionally a portion of the cementing string and structurally constituting the lower section thereof, will herein be separately referred to as a cementing mandrel.

This mandrel F comprises a tubular body structure providing an axial flow passage communicating with the bore of the tubing string E, said body structure including an upper body member 36 having an external cylindrical diameter enabling it to pass freely through the bores of the several stop sleeves 17 of the casing or liner, and a lower body member or tail pipe 37 telescopically united with said upper body member and dependingly supported thereby. The lower end of the upper body member 36 is formed to provide an inverted truncated latch-expanding cone 38 having an undercut latch-retaining lip 39 formed at the base of said cone. Above said cone the bore of the body member 36 is enlarged to provide a stop shoulder 40, and slidably disposed within this enlarged bore is a tubular head 41 which is tightly screwed upon the upper end of the lower body member 37 and is locked thereon by a set screw 42. The head 41 thus forms a rigid part of the depending body member 37, and in order to prevent relative rotation between the two body members, they are slidably keyed together by a key 43 which is carried by the upper body member 36 in position to engage within a companion longitudinal keyway formed in said head.

In order to prevent fluid leakage between the two telescopically united body members, the head 41 is provided with a suitable packing ring 44, and for the purpose of initially retaining the lower body member or tail pipe 37 in its uppermost or normal position, the two body members are connected by a shear screw 45 which constitutes a connecting means capable of being subsequently disabled to release the body member 37 for axial translation.

There is shown two plugs 46 which close holes employed in the proper assembling of the head 41 within the body member 36 and after said head is properly positioned therein, there is tightly screwed in the upper end of said body member a sub 47 which forms a rigid part of said body member and has an internally screw-threaded upper end by means of which it is detachably connected to the screw-threaded lower end of the run-in or cementing string E, this screw-thread connection being preferably in the form of a relatively course left-hand screw-thread to provide a safety feature, as will later be explained.

Near its lower end the mandrel body 37 is provided with transverse discharge passages 48 and with upper and lower external packing rings 49 and 50 respectively, disposed above and below said discharge passage. Various types of packing rings may be used and various forms of means may be employed for retaining them in place. However, I prefer to use the arrangement herein disclosed, in which rubber packing rings, each having an external medial annular lip 51 and marginal internal annular beads 52, are disposed with the beads thereof engaged in companion grooves formed in the mandrel body 37. These packing rings are retained in place by inner collars, 53 and 54 respectively, screw-threaded on the body 37 and each having an internally threaded side wall with said threads embedded into the body of its companion packing ring, and by opposed collars, 55 and 56 respectively, having similar screw-threaded engagement with the body 37 and the companion packing rings.

The collar member 55 is formed to provide diametrically opposed upright limbs which are connected at their upper ends to provide a latch restraining sleeve 57 surrounding and spaced from the body member 37, said collar having an internal flange 58 forming a spring seat for a compression spring 59 which surrounds said body in position to support a latching device that cooperates with the several stop devices of the casing to function as a one-way or uni-directional latch means.

This latch means is disposed within the latch restraining sleeve 57 and includes a ring member 60 and a plurality of resilient latch pawls 61 projecting upwardly therefrom with their upper latch ends extended above said sleeve so as to engage the latch-expanding cone 38. The several latch pawls are of duplicate form and while they may be separate units connected to the ring member in any desired manner, it is preferable to make said ring member and the pawls as an integral unit split longitudinally to form the several individual pawls, in the manner shown.

The upper inner wall of each latch pawl 61 is angled to provide an in-thrust surface 62 and from this surface the upper edge 63 of the pawl extends outwardly and downwardly to provide an angled upper end adapted to engage beneath the undercut retaining lip 39 at the base of the latch-expanding cone 38, when the latch means is in the expanded condition shown in Fig. 4. The outer surface of each pawl is formed to provide three relatively parallel straight wall surfaces normally vertically disposed, the upper straight wall surface 64 extending from the upper edge 63 downwardly to an inwardly and downwardly angled stop shoulder 65, the intermediate straight wall surface 66 extending from said stop shoulder downwardly to a surface 67 which is inwardly and downwardly angled in parallelism with the in-thrust surface 62 and extends to the lower straight wall surface 68.

When this latch device is in the normal collapsed condition shown in Fig. 3, the latch elevating spring 59 is in a compressed condition, the upper end of the several latch pawls 61 engage the lower portion of the latch-expanding cone 38, and the straight wall surfaces 66 of the several latch pawls are disposed within the upper end of the latch restraining sleeve 57 which thus normally restrains the latch pawls against expansion.

The lower end of the packing retaining collar 56 is tapered to facilitate downward passage of the mandrel through the several cementing devices of the casing, and has a discharge bore which has a diameter slightly less than that of the bore of the mandrel body so as to provide a stop shoulder 70 which will function to arrest downward travel of a tubular valve 71 slidably mounted within the bore of the mandrel body 37. Said valve is normally disposed in the upper position shown in Fig. 3, so as to cover and close the lateral discharge passages 48, and is initially retained in this closed position by a shear screw 72. The bore of said valve is formed to provide an annular seat 73 adapted for engagement by a closure means or bridging ball 74 which will be inserted in the cementing line at the well surface and circulated downwardly therein to engage said seat and thus close the bore of the tubular valve 71, and for the purpose of preventing fluid leakage past said valve, it is provided with a packing ring 75 disposed within a groove in its outer wall surface to engage the wall of the mandrel bore.

From the above it will be understood that a liner or casing to be cemented in the well bore will be made up to include any required number of stage cementing devices relatively spaced the proper distances apart, and that each of the necessary reversed basket packers will be wired in collapsed condition before the liner or casing is lowered into the well.

As an example of one use of the apparatus, I have illustrated a two-stage cementing operation, showing in Fig. 1 a properly conditioned perforated liner as it is initially positioned within a well bore, there being no inverted basket packer above the uppermost cementing device D since the height of the final cementing is usually controlled within close enough limits by the quantity of cement comprising the batch ejected at such uppermost station. However, it will be obvious that the operator may use an additional packer above the uppermost cementing device, if he so desires.

With the liner 10 in place, the cementing string E, with the latching device of its mandrel F retained in its initial collapsed condition, is run in to pass the mandrel idly through the several cementing devices to a position below the lower cementing device C, as illustrated in Fig. 3. As the mandrel F passes through the liner 10, it will sever the retaining wire 35 of the inverted basket packer 31 (or of all thereof if more than one is employed) and thus release said packer so that it will immediately expand into contact with the wall of the well bore 11. Circulation will then be established through the cementing string E and its mandrel F to flush the apparatus and the well bore free of any drillings, heavy mud, or other substances which may seriously interfere with the subsequent cementing, this desirable condition being readily ascertained by observing the action of the circulation pump and a reading of the pressure gauges thereof. After a free circulation is attained, the operator will send the ball 74 down the cementing string to engage the annular seat 73 and close the bore of the tubular valve 71. With escape of the circulation fluid from the cementing string thus shut off, the pressure thereof will rapidly increase to exert on the body member 37 a downward thrust sufficient to shear the screw 45 and drive said body member downwardly. This downward movement of the depending body member 37 in relation to the latch pawls 61, which are urged upwardly by the compressed spring 59, will withdraw the pawl restraining sleeve 57 from its normal engagement with the straight surfaces 66 of the several latch pawls, thus releasing said pawls which will immediately be forcefully elevated by the spring 59. Such elevation of the tripped latch device in relation to the relatively stationary latch-expanding cone 38 will cause expansion of the several latch pawls, each of which will assume a position like that shown in Figs. 4 and 5. In this expanded position the in-thrust surface 62 of each pawl will closely engage the cone surface while its upper end will engage beneath the undercut retaining lip 39, and its straight surface 68 will engage the inner wall surface of the latch-restraining sleeve 57, the cone thus preventing inward radial movement of the several latch pawls while said retaining lip and said sleeve cooperate to prevent outward radial movement thereof.

Continued increase of the pressure of the circulation fluid will cause the valve retaining screw 72 to be sheared to release the valve 71 and translate said valve downwardly until it is arrested by contact with the stop shoulder 70, in which position it will have passed and uncovered the lateral discharge passages 48 of the mandrel. With the discharge passages 48 thus opened, there will be an immediate drop in the pressure within the cementing string above the bridging ball, which pressure drop will indicate to the operator that the latching means is in proper condition to function.

To thereafter condition the apparatus for a first cementing operation, the operator at the well surface will elevate the cementing string E to draw its mandrel F upwardly through the first cementing device C to a position somewhat above said first cementing device. During such upward movement the upper edges 63 of the several latch pawls 61 engage the lower edge of the lower stop sleeve 17 to momentarily arrest the upward travel of the latch device.

Continued upward travel of the mandrel body will elevate the latch-expanding cone 38 in relation to the arrested latch device to permit collapse of the several latch pawls, such collapse of said pawls being effected by the cam action between their upper angled edges 63 and the chamfered lower edge of the bore of the stop sleeve 17. As the pawls collapse, the spring 59 will again be compressed and when said pawls are sufficiently collapsed to pass through the bore of said stop sleeve, the stop device will again be elevated with the mandrel body with the straight surfaces 64 of the several pawls engaging the wall of said bore and the spring 59 properly tensioned so that when said pawls are released from the restraint of the encircling stop sleeve, the latch device will again be independently translated upwardly on the latch-expanding cone by the compressed spring to again expand the latch pawls.

If it is desired at this time to test the packing efficiency of the mandrel packings 49 and 50 before proceeding with a cementing operation, the mandrel F will be lowered to engage these two packing rings within an imperforate portion of the stop sleeve 17, as shown in Fig. 5, in which position circulation fluid discharging through the lateral passages 48 will be confined between said packing rings. The circulation pressure may then be raised to the degree which it is desired that the packing rings shall hold, and if said rings hold such pressure without appreciable loss, the operator will, by the action of the circulation pumps and pressure gauges, be informed of an efficient condition of the packing rings. Obviously such test may be conducted at any time before or after a cementing operation or between any two cementing operations.
In preparation for a cementing operation, the cement string will then be slowly lowered until the stop shoulders 65 of the several pawls 61 engage the chamfered upper edge of the axial bore of the stop sleeve 17 and thus arrest the mandrel F in position to bring its discharge passages 48 into cooperative alignment with the passages 19 of the stop sleeve. This positions the packing rings 49 and 50 above and below said passages 19, as shown in Fig. 4, so as to provide a fluid-tight engagement between the mandrel and the stop sleeve.

It will be pointed out that the latch pawls, by their cooperation wth the chamfered or beveled edge of the bore of the several stop sleeves 17, provide a uni-directional latch mechanism which, when in operative condition, will permit unrestricted upward travel of the mandrel and be effective to automatically arrest a return downward travel thereof at definite predetermined points. The arresting of the mandrel at any cementing station by the latching means will be indicated at the well surface by the relieving of weight or strain on the cementing string, and the operator will thus be informed of the proper positioning of the mandrel at the successive cementing stations.

With the mandrel F properly positioned as shown in Fig. 4, the fluid will pass through the passages 48 and 19, past the back-pressure valve 20 and through the chamber 18 and the associated ports 15 to discharge into the adjacent annular space between the basket packers 30, 31 which define the first cementing zone, the fluid flushing this cementing zone and escaping into the liner through the overflowing passages 34. This re-establishing of the circulation will be indicated to the operator by the resulting drop in pressure, and when the operator is satisfied that the cementing zone has been properly flushed, the cementing of this lower cementing zone will be effected by pumping down the cement string a batch of cement slurry of sufficient volume to completely fill the annular space between the lower pair of basket packers 30, 31, the cement slurry flowing through the cementing device C and discharging into said annular space through the ports 15, any excess cement overflowing into the liner through the overflow passages 34.

The first cementing operation having been completed, the cementing string will again be elevated to withdraw its mandrel F from the lower cementing device C and position it just above the lower overflow passages 34, and the circulation of flushing fluid continued to clear the cementing mandrel of cement and to wash out any excess cement which overflowed into the liner during the first cementing operation.

The next cementing operation will be effected in substantially the same manner as was the first cementing operation above described; that is, the cementing string will be again elevated to position its mandrel above the second cementing device D, the packing test then being conducted, if desired, and the cementing string then being slowly lowered to properly position the mandrel at the second cementing device. After a flushing of the second cementing zone, a second batch of cement slurry will then be pumped down and discharged into the annular space at said second cementing zone to complete the cementing job at this zone.

After the several cementing operations are completed, the cementing string will be withdrawn from the well and the cement allowed to set. Subsequently, a water test and such other tests as are necessary or desirable may be made and thereafter the several stop sleeves 17 can be drilled out to clear the liner or casing for future producing or in preparation for continued drilling to deepen the well bore.

Should the cementing mandrel F accidentally become cemented in a stop sleeve of the casing, or should it for any other reason become so tightly stuck or frozen therein as to be incapable of being withdrawn by an upward pull on the tubing string E, said tubing string may be easily disconnected from the sub 47 by rotation in a right-hand direction and can then be withdrawn from the well, leaving the stuck mandrel F in the casing to be subsequently fished out or drilled up in a later drilling operation, if necessary.

From the above it will be apparent that I have provided an apparatus by the use of which series cementing may be effectively accomplished at two or more cementing stations in progressive upward sequence.

While the apparatus herein illustrated and described is fully capable of fulfilling the objects and purposes primarily stated, it is to be understood that I do not wish to restrict the invention to the specific embodiment herein disclosed, for it is susceptible of embodiment in various other forms, all coming within the scope of the appended claims.
Having thus described my invention, what I claim and desire to secure by Letters Patent is:

1. In combination with a well casing having a lateral discharge port formed therein, a cementing mandrel adapted to be lowered into the casing by a string of tubing and provided with a lateral discharge passage for discharging cement from said tubing, and means having complemental latch elements respectively disposed on said mandrel and within the casing adjacent its discharge port, said elements permitting upward travel of the mandrel and tubing and cooperating to arrest downward travel thereof to dispose said mandrel at a position to discharge cement from the tubing and through the discharge port of the casing.

2. In combination with a well casing having a lateral discharge port formed therein, a cementing mandrel adapted to be lowered into the casing by a string of tubing and provided with a lateral discharge passage for discharging cement from said tubing, means having complemental elements respectively disposed on said mandrel and within the casing adjacent its discharge port, said elements permitting upward travel of the mandrel and tubing and cooperating to arrest downward travel thereof to dispose said mandrel at a position to discharge cement from the tubing and through the discharge port of the casing, and opposed packing means carried by the casing and disposed in the annular space between the casing and the wall of the well bore respectively below and above the discharge port of the casing and adapted to engage said wall to define the cementing zone and limit the downward and upward travel of the cement discharged into said annular space.

3. In combination with a well casing having a lateral discharge port formed therein, a cementing mandrel adapted to be lowered into the casing at the end of a string of tubing, stop means mounted in the casing adjacent said port, and uni-directional latch means having complemental parts on said stop means and said mandrel permitting upward travel of the mandrel past the stop means and functioning to arrest downward travel thereof at a predetermined point, at which point said mandrel is in cementing position relative to the discharge port of the casing.

4. In combination with a well casing having a lateral discharge port formed therein, a cementing mandrel adapted to be lowered into the casing at the end of a string of tubing, stop means mounted in the casing adjacent said port, uni-directional latch means having complemental parts on said stops means and said mandrel permitting upward travel of the mandrel past the stop means and adapted to arrest downward travel thereof at a predetermined point to stop said mandrel in cementing position relative to the discharge port of the casing, means normally restraining the latch means in inactive position to permit initial downward travel of the mandrel past said stop means, and means for actuating said restraining means to permit a subsequent functioning of the latch means.

5. In combination with a well casing having a lateral discharge port formed therein, a cementing mandrel adapted to be lowered into the casing by a string of tubing, stop means mounted in the casing adjacent said port, a one-way latch on the mandrel adapted to ratchet past said stop means during upward travel of said mandrel and to engage said stop means during downward travel of the mandrel to arrest said mandrel in cementing alignment with the discharge port of the casing.

6. In combination with a well casing having a lateral discharge port formed therein, a cementing mandrel adapted to be lowered into the casing by a string of tubing, stop means mounted in the casing adjacent said port, a one-way latch on the mandrel adapted to ratchet past said stop means during upward travel of said mandrel and to engage said stop means during downward travel of the mandrel to arrest said mandrel in cementing alignment with the discharge port of the casing, means for restraining said latch in inactive position to permit initial downward travel of the mandrel past said stop means, and means for actuating said restraining means to permit a subsequent functioning of the latch.

7. In combination with a well casing having a lateral discharge port formed therein, stop means mounted within the casing adjacent said port, a tubular cementing mandrel having a normally open bore and a lateral discharge passage formed in its side wall to communicate with said bore, said mandrel being adapted to be lowered into the casing at the lower end of a string of tubing, a one-way latch on the mandrel adapted to ratchet past said stop means during upward travel of said mandrel and to engage said stop means during downward travel thereof to arrest said mandrel in a cementing position to bring its discharge passage into cementing alignment with the discharge port of the casing, means normally restraining said latch in inactive position to permit an initial lowering of the mandrel past said stop means, tubular valve means normally closing the lateral discharge passage of the mandrel and slidably mounted in the bore thereof and connected with the latch restraining means, means for retaining said valve means in normal position, and means adapted to be sent down the tubing string to close the bore of said valve means to effect a building up of fluid pressure within the tubing string, said pressure increase being effective to actuate the latch restraining means to release said latch and to subsequently disable said valve retaining means and translate the tubular valve to open the discharge passage of the mandrel.

8. In combination with a well casing having a lateral discharge port formed therein, a stop means mounted in the casing adjacent said port, a cementing mandrel adapted to be lowered into the casing at the end of a string of tubing and having a lateral discharge passage in its side wall, uni-directional latch means having complemental parts on said stop means and said mandrel permitting upward travel of the mandrel past said stop means and functioning to arrest downward travel thereof at a such point that cement discharged from the mandrel through its discharge passage will discharge through said casing discharge port, and back-pressure valve means carried by the casing and preventing reverse flow of the cement.

9. In combination with a well casing having a lateral discharge port formed therein, a cementing mandrel adapted to be lowered into the casing at the end of a string of tubing, stop means mounted in the casing adjacent said port, uni-directional latch means having parts on said stop means and said mandrel permitting upward travel of the mandrel past the stop means and functioning to arrest downward travel thereof at a position to discharge cement from the tubing through the discharge port of the casing and into the annular space between the casing and the wall of the well bore, and opposed packing means carried by the casing and respectively disposed below and above the discharge port thereof and adapted to engage the wall of the well bore to define the cementing zone and limit the downward and upward travel of the cement discharged into said annular space.

10. In combination with a well casing having lateral discharge ports in its side wall relatively spaced longitudinally to define successive cementing stations, stop devices within the casing disposed respectively at each cementing station, a cementing mandrel adapted to be lowered into said casing by a string of tubing and provided with a lateral discharge passage, a one-way downwardly effective latch carried by said mandrel, means normally restraining said latch in inactive position to permit an initial lowering of the mandrel past the several stop means, tubular valve means normally closing the discharge passage of the mandrel and slidably mounted in the mandrel bore and arranged to operate the latch restraining means, retaining means for holding said valve means in normal position, and means adapted to be sent down the tubing string to bridge the bore of said tubular valve to effect a building up of fluid pressure within the mandrel, said pressure increase being effective to actuate the latch restraining means and thus release said latch for subsequent cooperation with the several stop devices in upward sequence and to subsequently overcome said valve retaining means and translate said valve to open the discharge passage of the mandrel, said one-way latch cooperating successively with the stop means at each casing port, beginning with the lowermost stop means, to ratchet past said stop means as the mandrel is elevated and to arrest a return downward travel of the mandrel to position its discharge passage in cementing alignment with said casing port, before the mandrel is further elevated to the next higher cementing station.

11. A casing adapted to be cemented in a well bore and having a lateral discharge port therein, a tubular stop device secured therein adjacent said discharge port and having a medial portion of reduced external diameter forming, with the casing wall, an annular chamber with which said discharge port communicates, said device being provided with a lateral passage communicating with its bore and with said chamber, and a back-pressure valve disposed in said chamber and normally closing said communicating passage.

12. A casing as defined in claim 11, in which the bore of the stop device is chamfered or beveled at opposite ends for cooperation with a device adapted to be translated through said bore.

13. A casing as defined in claim 11, in combination with opposed expansible packers surrounding the casing and mounted thereon respectively below and above said casing port and adapted to engage the wall of a well bore.

14. A casing adapted to be cemented in a well bore and having formed therein a lateral discharge port and diametrically opposite apertures spaced upwardly from said port, stop means mounted in the casing adjacent said port and adapted to be engaged by a device to be subsequently lowered into the casing, a basket packer surrounding and mounted on the casing below the discharge port and facing upwardly, an opposed basket packer surrounding and reversely mounted on the casing above said discharge port to face downwardly, and a wire initially holding the upper reversed packer in collapsed condition for safe passage down a well bore, said wire passing through said diametrically opposite apertures to span across the bore of said casing in position to be later severed by said device in its passage down the casing to release said reversed packer.

15. A casing as defined in claim 14, in which an overflow passage is formed in the casing wall in position to communicate with the interior of the upper reversed packer closely adjacent its upper closed end.

16. A structure adapted for use in cementing of a well casing, said structure comprising a tubular coupling threaded at opposite ends for connection to adjacent lengths of casing and having a lateral discharge port, a tubular stop device secured within said coupling and having a medial portion of reduced external diameter forming, with the coupling, an annular chamber with which said port communicates, said device being provided with a lateral passage communicating with its bore and with said chamber, and a back-pressure valve disposed in said chamber and normally closing said communicating passage.

17. In combination with a string of tubing having near its lower end a lateral discharge passage formed therein, latch means mounted thereon adjacent said passage, means normally restraining said latch means in ineffective position, a tubular valve normally closing the discharge passage of said tubing and slidably mounted in the bore thereof, connecting means capable of being disabled operatively connecting said valve with said latch restraining means and functioning to initially retain said valve in closed position, and a bridging element adapted to be sent down the tubing string to close the bore of said tubular valve to effect a building up of fluid pressure in the tubing string, said pressure increase being effective to actuate said restraining means to release said latch means and to disable the valve retaining means and translate said valve to open the dischrge passage.

18. A cementing mandrel adapted for attachment to the lower end of a string of tubing, said mandrel comprising a tubular body having a lateral discharge passage, latch means mounted on said body, means normally restraining said latch means in inactive position, a tubular valve normally closing said discharge passage and slidably mounted within the bore of said body, and means capable of being disabled operatively connecting said valve with the latch restraining means and functioning to normally retain said valve in closed position, the bore of said tubular valve being formed for closure by a bridging element to be sent down the tubing string.

19. A cementing mandrel adapted for attachment to the lower end of a string of tubing, said mandrel comprising a tubular body having a lateral discharge passage, opposed packing rings mounted on the body and disposed respectively below and above said discharge passage, latch means mounted on said body, means normally restraining said latch means in inactive position, a tubular valve normally closing said discharge passage and slidably mounted within the bore of said body, and connecting means capable of being disabled operatively connecting said valve with the latch restraining means and functioning to retain said valve in closed position, the bore of said tubular valve being formed for closure by a bridging element to be sent down the tubing string.

20. A cementing mandrel adapted for attachment to the lower end of a string of tubing, said mandrel comprising a tubular body having a lateral discharge passage, opposed packing rings mounted on the body and disposed respectively below and above said discharge passage, a circular series of longitudinally disposed one-way latch pawls mounted on and surrounding said body, a sleeve surrounding said pawls and normally restraining them in collapsed condition, means for translating said sleeve to release said pawls, a tubular valve normally closing said discharge passage and slidably mounted in the body bore, a shear element initially retaining the tubular valve in closed position, the bore of said tubular valve being formed for closure by a bridging element to be sent down the tubing string.

21. A tubular cementing mandrel providing a normally open longitudinal flow passage and having a lateral discharge passage, said mandrel comprising an upper body member and a depending body member extensibly connected for limited relative longitudinal movement, body connecting means capable of being disabled normally connecting said body members against relative movement, a latch-expanding means on the upper body member, a latch means longitudinally translatable on said depending body member to engage said latch-expanding means and be actuated thereby from a normal collapsed position to a radially expanded position, means on said depending body member normally restraining said latch means against expansion, means for automatically translating said latch means to expanded position when released from restraint of said latch restraining means through longitudinal movement of said depending body member and said restraining means, a tubular valve having a bore forming a portion of said flow passage and slidable therein from a normal position covering and closing said lateral discharge passage downwardly to an open position permitting a fluid discharge through said lateral passage, and valve retaining means capable of being disabled normally maintaining said valve in closed position, the bore of said valve being formed for closure by a bridging element to be sent down said flow passage.

22. A tubular cementing mandrel providing a normally open longitudinal flow passage and having a lateral discharge passage, said mandrel comprising an upper body member and a depending body member extensibly connected for limited relative longitudinal movement, body connecting means capable of being disabled normally connecting said body members against relative movement, means for preventing fluid leakage between said body members, a latch-expanding means on the upper body member, a latch means longitudinally translatable on said depending body member to engage said latch-expanding means and be actuated thereby from a normal collapsed position to a radially expanded position, means on said depending body member normally restraining said latch means against expansion, means for automatically translating said latch means to expanded position when released from restraint of said latch restraining means through longitudinal movement of said depending body member and said restraining means, a tubular valve having a bore forming a portion of said flow passage and slidable therein from a normal position covering and closing said lateral discharge passage downwardly to an open position permitting a fluid discharge through said lateral passage, and valve retaining means capable of being disabled normally maintaining said valve in closed position, the bore of said valve being formed for closure by a bridging element to be sent down said flow passage.

23. A tubular cementing mandrel providing a normally open longitudinal flow passage and having a lateral discharge passage, said mandrel comprising an upper body member and a depending body member extensibly connected for limited relative longitudinal movement, body connecting means capable of being disabled normally connecting said body members against relative movement, a latch-expanding means on the upper body member, a latch means longitudinally translatable on said depending body member to engage said latch-expanding means and be actuated thereby from a normal collapsed position to a radially expanded position, means on said depending body member normally restraining said latch means against expansion, means for automatically translating said latch means to expanded position when released from restraint of said latch restraining means through longitudinal movement of said depending body member and said restraining means, a tubular valve having a bore forming a portion of said flow passage and slidable therein from a normal position covering and closing said lateral discharge passage downwardly to an open position permitting a fluid discharge through said lateral passage, valve retaining means capable of being disabled normally maintaining said valve in closed position, the bore of said valve being formed for closure by a bridging element to be sent down said flow passage, and exterior packing means disposed above and below said lateral discharge passage.

24. A tubular cementing mandrel providing a normally open longitudinal flow passage and having a lateral discharge passage, said mandrel comprising an upper body member and a depending body member extensibly connected for limited relative longitudinal movement, body connecting means capable of being disabled normally connecting said body members against relative movement, a latch-expanding cone on the upper body member, a latch means longitudinally translatable on said depending body member to engage said latch-expanding cone and be actuated thereby from a normal collapsed position to a radially expanded position, means on said depending body member normally restraining said latch means against expansion, normally tensioned means for automatically translating said latch means to expanded position when released from restraint of said latch restraining means through longitudinal movement of said depending body member and said restraining means, a tubular valve having a bore forming a portion of said flow passage and slidable therein from a normal position covering and closing said lateral discharge passage downwardly to an open position permitting a fluid discharge through said lateral passage, and valve retaining means capable of being diabled normally maintaining said valve in closed position, the bore of said valve being formed for closure by a bridging element to be sent down said flow passage.

25. A cementing mandrel adapted for attachment to the lower end of a string of tubing, said mandrel comprising a tubular body having a lateral discharge passage, latch means mounted on said body, means normally restraining said latch means in inactive position, a tubular valve normally closing said discharge passage and slidably mounted within the bore of said body and operatively connected with the latch restraining means, and means for retaining said valve in closed position, the bore of said tubular valve being formed for closure by a bridging element to be sent down the tubing string.

26. A cementing mandrel adapted for attachment to the lower end of a string of tubing, said mandrel comprising a tubular body having a lateral discharge passage, opposed packing rings mounted on the body and disposed respectively below and above said discharge passage, latch means mounted on said body, means normally restraining said latch means in inactive position, a tubular valve normally closing said discharge passage and slidably mounted within the bore of said body and operatively connected with the latch restraining means, and means for retaining said valve in closed position, the bore of said tubular valve being formed for closure by a bridging element to be sent down the tubing string.

REUBEN C. BAKER.